US009835224B2

(12) United States Patent
Geislinger et al.

(10) Patent No.: US 9,835,224 B2
(45) Date of Patent: Dec. 5, 2017

(54) TORSIONAL VIBRATION DAMPER

(71) Applicant: Ellergon Antriebstechnik Gesellschaft m.b.H., Hallwang (AT)

(72) Inventors: Matthias Geislinger, Hallwang (AT); Cornelius Geislinger, Hallwang (AT)

(73) Assignee: ELLERGON ANTRIEBSTECHNIK GESELLSCHAFT M.B.H., Hallwang (AT)

( * ) Notice: Subject to any disclaimer, the term of this patent is extended or adjusted under 35 U.S.C. 154(b) by 139 days.

(21) Appl. No.: 14/931,203

(22) Filed: Nov. 3, 2015

(65) Prior Publication Data

US 2016/0123427 A1    May 5, 2016

(30) Foreign Application Priority Data

Nov. 3, 2014  (DE) .................................. 141 91 522

(51) Int. Cl.
*F16D 3/12* (2006.01)
*F16F 15/16* (2006.01)
*F16F 15/121* (2006.01)

(52) U.S. Cl.
CPC ........ *F16F 15/161* (2013.01); *F16F 15/1215* (2013.01); *F16F 15/165* (2013.01)

(58) Field of Classification Search
CPC ..... F16F 15/161; F16F 15/165; F16F 15/1215
USPC ...................... 464/27, 28, 82, 100
See application file for complete search history.

(56) References Cited

U.S. PATENT DOCUMENTS 4,307,585 A * 12/1981 Chivari ..................... F16D 3/56
                                                   464/82 X
8,905,851 B2 * 12/2014 Geislinger ............... F16D 3/56
                                                   464/100

FOREIGN PATENT DOCUMENTS

DE   102009004252 A1   7/2010
EP     2206933 A1       7/2010
FR     1375156 A       10/1964

OTHER PUBLICATIONS

European Search Report, dated Jun. 18, 2015, for European Patent Application 14191522.3.

* cited by examiner

*Primary Examiner* — Gregory J Binda
(74) *Attorney, Agent, or Firm* — Myers Wolin, LLC

(57) ABSTRACT

A torsional vibration damper comprises an outer housing, an inner part concentric relative to the outer housing, a plurality of chambers formed between the outer housing and the inner part and being filled with a damping medium, a plurality of leaf spring assemblies joining the outer housing and the inner part in a torsionally flexible manner, wherein each of the leaf spring assemblies is arranged in one of said chambers and separates the corresponding chamber into sub-chambers, a plurality piston chambers formed separately in the outer housing, wherein each piston chamber is connected with the sub-chambers of one of the chambers, and a plurality of pistons adjustably arranged in the piston chambers, respectively, for controlling the flow of damper medium between the sub-chambers of a chamber. The damping properties of this torsional vibration damper can be adjusted easily.

20 Claims, 5 Drawing Sheets

TORSIONAL VIBRATION DAMPER

CROSS REFERENCE TO RELATED APPLICATIONS

This application claims priority under 35 USC §119 to European Patent Application No. EP 14191522.3, filed on Nov. 3, 2014, the contents of which are incorporated herein by reference.

FIELD OF THE INVENTION

The present invention relates to a torsional vibration damper comprising an outer housing, an inner part concentric relative to the outer housing, a plurality of chambers formed between the outer housing and the inner part and being filled with a damping medium, and a plurality of leaf spring assemblies joining the outer housing and the inner part in a torsionally flexible manner, wherein each of the leaf spring assemblies is arranged in one of said chambers and separates the corresponding chamber into a first sub-chamber and a second sub-chamber.

Torque transmission between the inner part and the outer housing takes place in a flexible manner by means of the leaf spring assemblies. Upon relative rotation between the inner part and the outer housing about a common axis of rotation, the leaf spring assemblies bend back and forth in circumferential direction thereby temporarily increasing and decreasing the volume of the first and second sub-chambers. This results in displacement of damping medium through overflow channels between different chambers as well as through bypasses connecting a first and second sub-chamber of a chamber. The flow of damping medium through these overflow channels and bypasses causes a hydraulic damping effect.

BACKGROUND

Such torsional vibration dampers can be used for example in large two-stroke and four-stroke diesel engines and gas engines for counteracting torsional vibrations in the power train. The torsional vibration damper, which may have diameters of up to four meters, is, for example, flanged to a crankshaft of the engine. Torsional vibration dampers of the type mentioned above can also be used on other rotating parts such as camshafts, intermediate shafts and axle drive shafts, as well as gearboxes.

A torsional vibration damper of this type is known e.g. from EP 2 206 933 A1 corresponding to DE 10 2009 004 252 B1. In this damper the hydraulic damping effect is dominated by radial gaps that are formed between the outer housing and the inner part and that connect neighboring chambers.

In large torsional vibration dampers of this type additional bypasses are formed by one annular channel at an internal side wall of the outer housing. The length of the bypasses in circumferential direction is limited by the thickness of the leaf spring assemblies. FIG. 4 shows a conventional torsional vibration damper 1 having a ring 2 arranged in the annual channel 3 for adjusting the axial width of the bypasses 4 and thus the damping properties. This single ring 2 is concentric to the common axis of rotation of the outer housing 5 and inner part 6 and is adjustable via a plurality of screws 7. Such adjustment is required for example for compensating machining tolerances that can hardly be avoided for large diameters as well as for other reasons. The hydraulic damping effect created by these additional bypasses 4 is usually larger than that of the afore-mentioned overflow channels.

Adjustment of such a damper, in particular when being connected to a crankshaft inside a motor casing, requires opening a lid at the motor casing for access to the adjustment screws 7 and rotating the crank shaft screw by screw. In order to prevent excessive warping or twisting of the ring several turns of the crankshaft are required for achieving the desired amount of adjustment at each screw and corresponding axial gap since each screw has to be operated several times and usually cannot be rotated in its final position in one step to avoid too strong deformation of the ring 2.

Another torsional vibration damper is known from FR 1 375 156 wherein the damping force is controlled in response to centrifugal forces by spring-biased piston mechanisms. These spring-biased piston mechanisms are held in position by a screw plug, which, however, does not provide any option for adjustment. This mechanism is therefore not suitable for the above-described tuning of the damper after assembly. Further, FR 1 375 156 teaches a piston for controlling flow of damper medium between neighboring chambers rather than between sub-chambers of one and the same chamber.

SUMMARY

The object of the present invention is to overcome the problems that are inherent to the art mentioned above.

The invention provides a torsional vibration damper, comprising an outer housing, an inner part concentric relative to the outer housing, a plurality of chambers formed between the outer housing and the inner part and being filled with a damping medium, a plurality of leaf spring assemblies joining the outer housing and the inner part in a torsionally flexible manner, wherein each of the leaf spring assemblies is arranged in one of said chambers and separates the corresponding chamber into sub-chambers, a plurality of piston chambers formed separately in the outer housing, wherein each piston chamber is connected with the sub-chambers of one of the chambers, and a plurality of pistons adjustably arranged in the piston chambers, respectively, for controlling the flow of damper medium between the sub-chambers of a chamber.

Through the use of a plurality of independent adjustment heads, i.e. adjustable pistons, the damping properties of an inventive torsional vibration damper can be adjusted faster than in a conventional damper having the above described ring. This may significantly reduce the time required for adjustments of a power train during a sea trial of a ship.

In addition, the length of the bypass is independent of the axial width of the annular channel at the leaf spring assemblies and independent of the thickness of the leaf spring assemblies in circumferential direction so that adjustment can be performed more easily and more precisely.

Further, the hydraulic damping properties of the damper are substantially independent of machining tolerances of the leaf spring assemblies, the annular channel and the corresponding ring. In fact, the present invention avoids the need of a thin large diameter ring with high dimensional accuracy and shape accuracy. As compared to such a ring, the production of the significantly smaller pistons is much easier, and since at least similar adjustment heads may be used in different dampers, they can be produced in series. This reduces manufacturing costs.

Moreover, it is possible to remove the adjustment head through a lid in a motor casing for endoscopic inspection of the leaf spring assembly without disassembly of the whole torsional vibration damper or the need for additional inspection holes.

According to an embodiment of the invention the pistons are mounted into the piston chambers from a side opposite to the chambers receiving the leaf spring assemblies, which simplifies assembly of the damper.

According to another embodiment of the invention the piston chambers are spaced apart from the chambers by partition walls that are integrally formed with a side wall of the outer housing. This increases the length of the bypasses and enhances precise adjustment of the damping properties. In addition, this reduces the risk of varying manufacturing tolerances between the leaf spring assemblies and the inner face of the side wall. The remaining axial gap that is required for allowing the springs to bend back and forth in the chambers during operation is so small that leakage of damping medium through these gaps has no substantial impact on the damping properties.

Preferably, a control gap is formed between the piston and a portion of the outer housing within the corresponding piston chamber, which control gap is arranged remote from the chamber and adjustable through the piston. By this, it is possible to further increase the length of the bypasses, which enhances precise adjustment of the damping properties.

Further, the gap may be fluidly connected with the chamber via openings formed in the side wall and extending axially through the side wall from the chamber to the piston chamber. Such openings can be easily manufactured even in side plates of large diameters.

In general, however, each piston chamber can be connected via fluid channels with the sub-chambers, said fluid channels being each formed by one or more openings in the outer housing.

According to a further embodiment the chambers are separated in circumferential direction by inner circumferential sections. At least one of these chambers is divided by the leaf spring assembly into two sub-chambers, namely a first sub-chamber and a second sub-chamber, that are formed between an outer side of the outermost spring and an opposing wall of the adjacent inner circumferential sections, respectively. This is particularly useful for applications that imply alternating loads on the springs of the leaf spring assemblies.

In yet another embodiment at least one of the chambers is divided by the leaf spring assembly into three sub-chambers, namely a first sub-chamber and a second sub-chamber, that are formed between an outer side of the outermost spring and an opposing wall of the adjacent inner circumferential sections, respectively, and a third sub-chamber formed between at least two springs of the leaf spring assembly. This may be preferred for pulsating loads on the leaf springs of the leaf spring assemblies.

According to another embodiment of the invention the torsional vibration damper further comprises a plurality of locking means for individually securing the positions of the pistons in the piston chambers. These locking means may be of any known type. Preferably, they can be accessed from the outside of the damper so as to easily change the damping properties of the damper when required.

According to yet another embodiment of the invention each piston chamber is formed as a ring around a central projection and the corresponding piston is fastened on the projection. This structure unites easy manufacturing and assembly with proper adjustment. The central projection increases the length of the bypass.

Preferably, the piston is threaded engaged with the central projection. By rotating the piston it is possible to adjust the gap in the piston chamber and thus throttle the flow between the first and second sub-chamber. The central projection may have an external thread and the piston is threadedly engaged with the external thread of the central projection though an internal thread connection may be contemplated as well.

Further, the piston may be countered by a screw to secure the position of the piston and accordingly the damping properties after adjustment.

The screw may extend through the piston and is threaded engaged with a threaded hole on the central projection.

According to yet another embodiment of the invention a sealing ring is arranged between an outer circumferential wall of the piston and an inner circumferential wall of the piston chamber, thereby preventing leakage at the adjustment heads.

According to another embodiment a torsional vibration damper comprises an outer housing; an inner part concentric relative to the outer housing; a plurality of chambers formed between the outer housing and the inner part and being filled with a damping medium; a plurality of leaf spring assemblies joining the outer housing and the inner part in a torsionally flexible manner, wherein each of the leaf spring assemblies is arranged in one of said chambers and separates the corresponding chamber into at least two sub-chambers; a plurality piston chambers formed separately in the outer housing, wherein each piston chamber is connected with the sub-chambers of one of the chambers; and a plurality of pistons adjustably arranged in the piston chambers, respectively, for controlling the flow of damper medium between the sub-chambers of the corresponding chamber when displacement of damping medium occurs in said chamber due to bending of the corresponding leaf spring assembly; wherein the pistons are mounted into the piston chambers from a side opposite to the chambers receiving the leaf spring assemblies.

According to yet another embodiment a torsional vibration damper comprises an outer housing; an inner part concentric relative to the outer housing; a plurality of chambers formed between the outer housing and the inner part and being filled with a damping medium; a plurality of leaf spring assemblies joining the outer housing and the inner part in a torsionally flexible manner, wherein each of the leaf spring assemblies is arranged in one of said chambers and separates the corresponding chamber into at least two sub-chambers; a plurality piston chambers formed separately in the outer housing, wherein each piston chamber is connected with the sub-chambers of one of the chambers; and a plurality of pistons adjustably arranged in the piston chambers, respectively, for controlling the flow of damper medium between the sub-chambers of the corresponding chamber when displacement of damping medium occurs in said chamber due to bending of the corresponding leaf spring assembly; wherein a control gap is formed between the piston and a portion of the outer housing within the corresponding piston chamber, which control gap is arranged remote from the chamber and adjustable through the piston; and wherein each chamber is delimited axially by an inner face of a side wall of the outer housing and wherein the control gap is fluidly connected with the chamber via openings formed in the side wall and extending axially through the side wall from the chamber to the piston chamber.

BRIEF DESCRIPTION OF THE DRAWINGS

Embodiments of the invention will be described in greater detail hereinafter with reference to the accompanying drawings, in which.

DETAILED DESCRIPTION OF THE PREFERRED EMBODIMENTS

Figure 1:
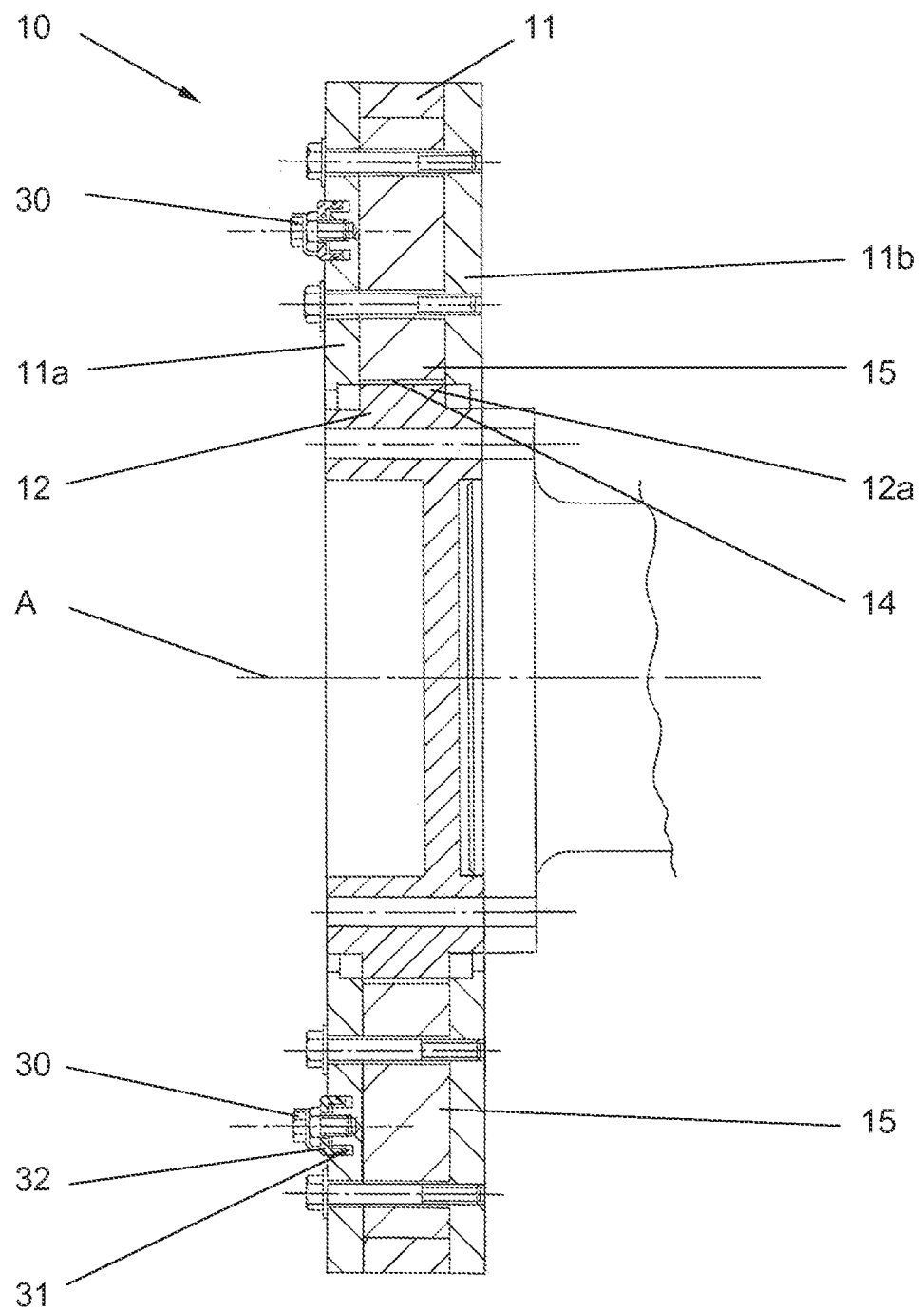
FIG. 1 is a longitudinal sectional view of an embodiment of a torsional vibration damper according to the present invention.

FIG. 1 shows a torsional vibration damper 10 which can be coupled to a rotating component such as a crankshaft for damping torsional vibrations about an axis of rotation A. The torsional vibration damper 10 comprises an outer housing 11 and an inner part 12 that are concentrically arranged around the axis of rotation A. The outer housing 11 and the inner part 12 delimit a plurality of separate chambers 13 which are filled with a liquid damping medium such as pressurized oil.

The chambers 13 are arranged in sequence in circumferential direction and are connected to one another through overflow channels 14. The overflow channels 14 are formed by radial gaps between inner circumferential sections 15 of the outer housing 11 and outer circumferential portions 12a of the inner part 12. The inner circumferential sections 15 of the outer housing 11 separate the chambers 13 in circumferential direction around the axis A. Side walls 11a and 11b of the outer housing 11 delimit the chambers 13 in axial direction.

A plurality of torque-transmitting leaf spring assemblies 17 join the outer housing 11 and the inner part 12 in a torsionally flexible manner so that the outer housing 11 can be rotated back and forth in a certain angular range relative to the inner part 12. Each of the leaf spring assemblies 17 is arranged in one of said chambers 13 and divides the corresponding chamber 13 into at least two sub-chambers.

The sub-chambers of at least some chambers 13 are connected by a bypass 16 allowing damping medium to flow axially around the leaf spring assembly 17 of the corresponding chamber 13.

Relative rotation of the outer housing 11 and the inner part 12 causes deformation of the leaf spring assemblies 17 and thus displacement of damping medium via the bypasses 16 and the overflow channels 14 resulting in a hydraulic damping effect. The leaf spring assemblies 17 bend back and forth in circumferential direction thereby temporarily increasing and decreasing the volumes of the sub-chambers.

Figure 2A:
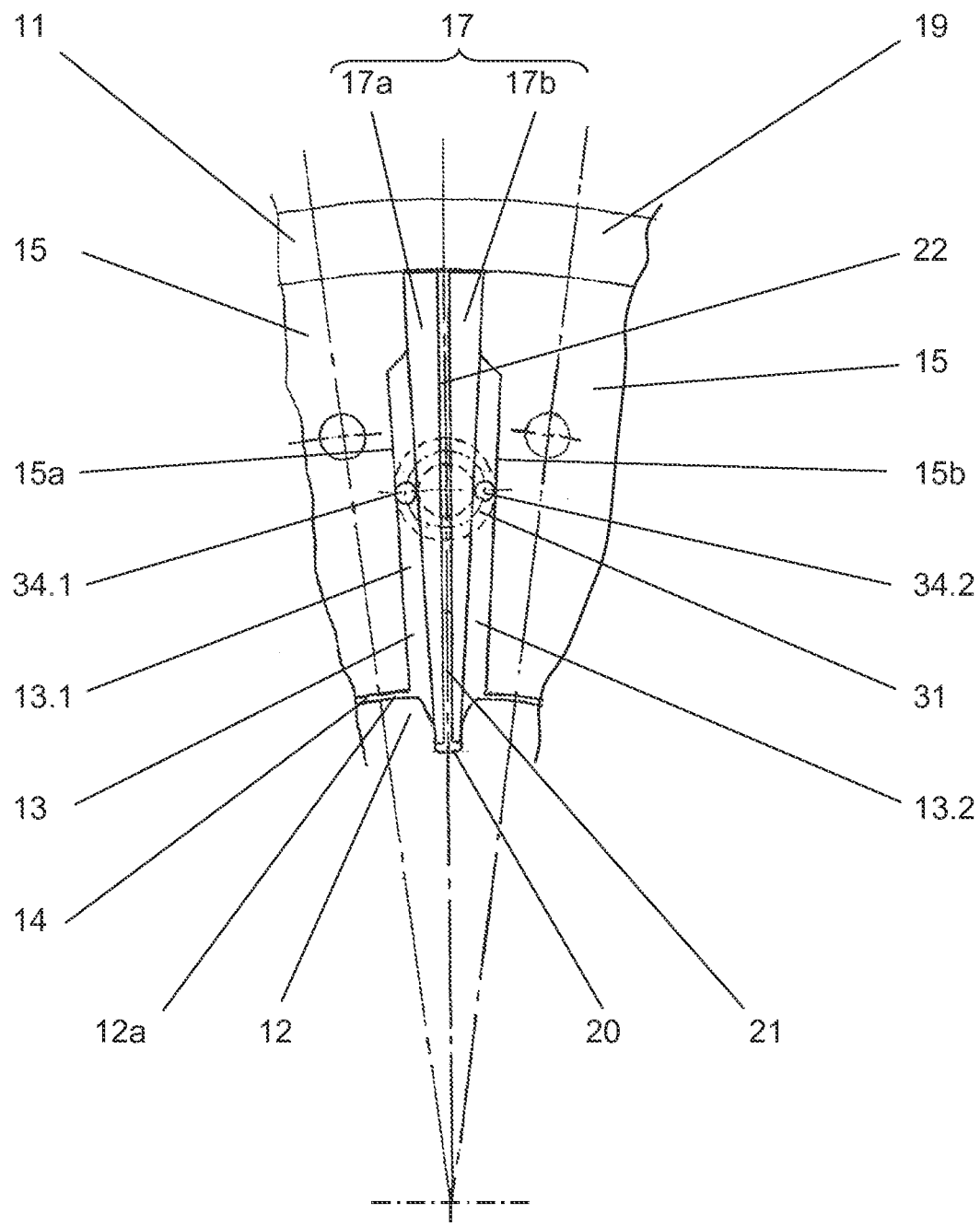
FIG. 2a is a cross sectional view of an embodiment of a torsional vibration damper of the type according to FIG. 1 and showing a first example of a leaf spring assembly.
Figure 2B:
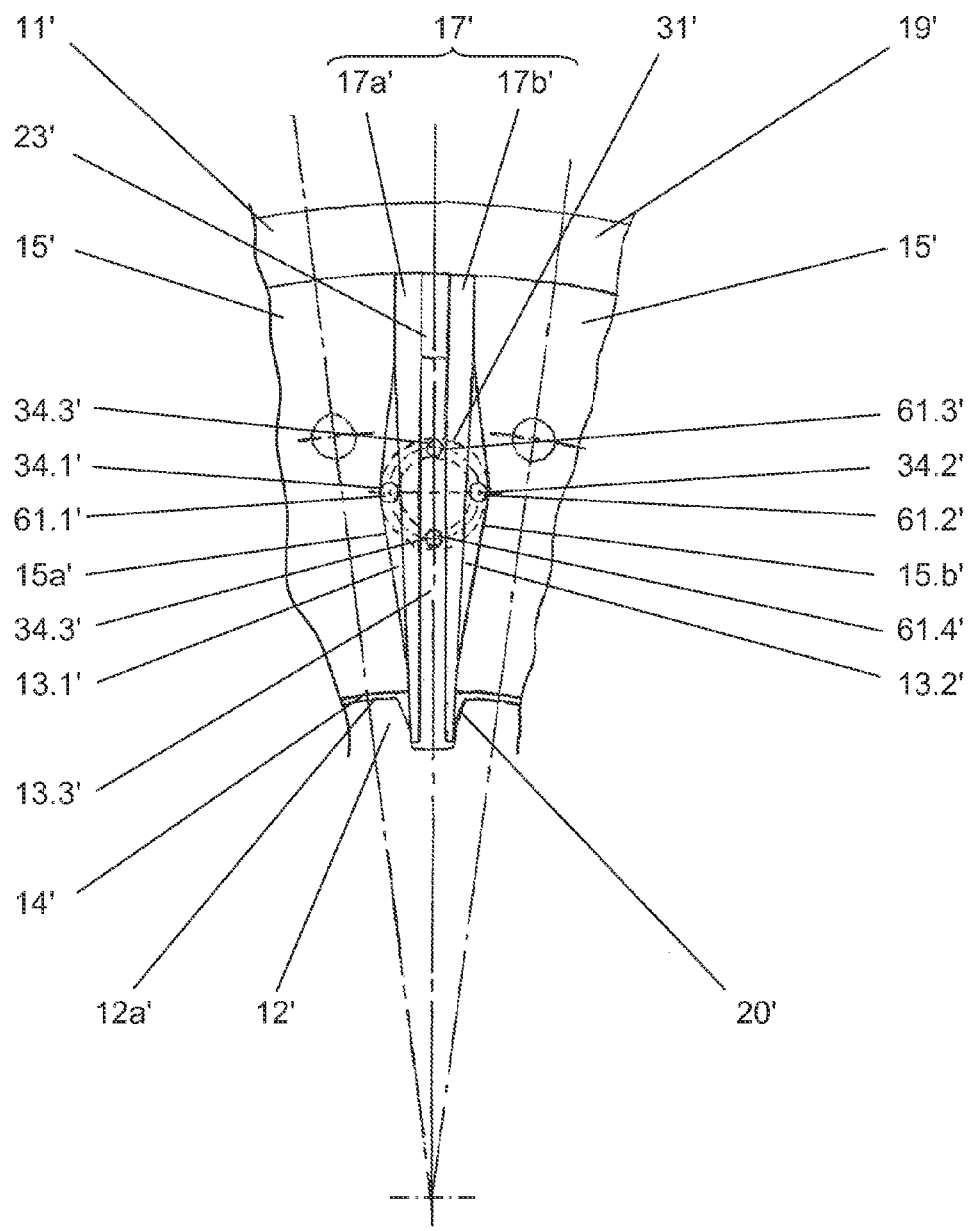
FIG. 2b is a cross sectional view of an embodiment of a torsional vibration damper of the type according to FIG. 1 and showing a second example of a leaf spring assembly.

Examples of leaf spring assemblies 17 are shown in greater detail in FIGS. 2a and 2b. In both examples, each leaf spring assembly 17 may comprise one or more, e.g. two leaf springs 17a and 17b made of spring steel. The leaf springs 17a and 17b are fixed with radially outer end portions on the outer housing 11. In the embodiment shown in FIGS. 2a and 2b, the leaf springs 17a and 17b are clamped in circumferential direction between said inner circumferential sections 15 of the outer housing 11 and are secured by means of a clamping ring 19. The circumferential sections 15 may be integral with a side wall 11a or 11b of the outer housing 11 or may be formed by intermediate pieces that are secured to the side walls 11a and 11b.

In a first example, as shown in FIG. 2a, two sub-chambers, namely a first sub-chamber 13.1 and a second sub-chamber 13.2 are respectively formed between an outer side of the outermost spring 17a and 17b and the opposing wall 15a and 15b of the adjacent intermediate inner circumferential sections 15. The leaf springs 17a and 17b each extend with their free ends towards and into a groove 20 formed on the outer circumference of the inner part 12. Each groove 20 may form two opposing flanks in circumferential direction. In a position under no load, shown in FIG. 2a, the leaf springs 17a and 17b may each be held in contact against one of the flanks of the groove 20. An intermediate plate 22 is sandwiched between the leaf springs 17a and 17b and extends over about one half to two-thirds of the length of the leaf springs 17a and 17b so that the free ends of the leaf springs 17a and 17b are spaced apart from each other by a small free space 21. The leaf springs 17a and 17b are able to deflect during operation of the damper without contacting each other. The small free space 21 is relatively small as compared to the volume of the first and second sub-chambers 13.1 and 13.2 so that, practically, the leaf spring assembly 17 subdivides the chamber 13 into the first sub-chamber 13.1 and the second sub-chamber 13.2. Upon relative rotation of the outer housing 11 and the inner part 12 both leaf springs 17a and 17b deform. It is to be emphasised that the number of leaf springs in a leaf spring assembly 17 is not limited to two but may be larger or smaller than shown in FIG. 2a. E.g. each leaf spring 17a and 17b may be replaced by a spring pack of several leaf springs. Further, it would be possible to reduce the leaf spring assembly 17 to a single leaf spring. The example in FIG. 2a is particularly useful for alternating loads on the leaf spring assemblies 17.

FIG. 2b shows a second example that is particularly useful for applications that require substantially pulsating loads on the leaf springs 17a' and 17b' of the leaf spring assemblies 17'. Spacers 23' between the fixed ends of neighboring leaf springs 17a' and 17b' increase the distance between them. The spacer 23' in the second example is limited to the area where the leaf springs 17a' and 17b' are clamped between the inner circumferential sections 15' so that a substantial free space remains between the leaf springs 17a' and 17b'. This free space forms a third sub-chamber 13.3' in addition to a first and second sub-chamber 13.1' and 13.2' that are formed between an outer side of the outermost spring 17a' and 17b' and the opposing walls 15a' and 15b' of the adjacent intermediate inner circumferential sections 15', respectively.

The leaf springs 17a' and 17b' each extend with their free ends towards and into a groove 20' formed on the outer circumference of the inner part 12'. Each groove 20' includes two opposing flanks in circumferential direction. In a position under no load, shown in FIG. 2b, the leaf springs 17a' and 17b' may each be held in contact against one of the flanks of the groove 20'. Upon angular displacement of the outer housing 11' relative to the inner part 12' in a first direction of rotation, one the leaf springs 17a' deforms while the other leaf spring 17b' remains in its undeformed state. If, for example in FIG. 2b, the inner part 12' is rotated clockwise by a small angle relative to the housing 11' the left leaf spring 17a' deflects while the right leaf spring 17b' remains undeformed at least for small angles. Accordingly, the volume of the first sub-chamber 13.1' increases while the volume of the third sub-chamber 13.3' decreases and the volume of the second sub-chamber 13.2' remains substantially unchanged.

As in the first example the number of leaf springs in a leaf spring assembly 17' is not limited to two but may be larger than shown in FIG. 2b. E.g. each leaf spring 17a' and 17b' may be replaced by a spring pack of several leaf springs.

Further, in both examples each of the leaf springs 17a, 17b, 17a' and 17b' tapers towards its radially inner end while alternatively, springs without taper may be used instead or in addition.

According to the present invention the torsional vibration damper 10 is provided with a plurality of adjustment heads 30 for adjusting the damping properties of the damper 10. An example of one adjustment head 30 is shown in detail in FIG. 3.

Each adjustment head 30 includes a piston chamber 31 formed in the outer housing 11 and a piston 32 adjustably arranged in the piston chamber 31. The piston chamber 31 is connected with the sub-chambers of one of the chambers 13 and the piston 32 is configured to control the flow of damper medium between the sub-chambers when displacement of damping medium occurs in the corresponding chamber 13 due to bending of the leaf spring assembly 17. When the piston 32 is moved deeper into the piston chamber 31 the hydraulic resistance of the bypass 16 increases, while vice versa, when the piston 32 is moved further out, the hydraulic resistance of the bypass 16 decreases.

In the present case the hydraulic damping effect caused by these bypasses 16 is larger than that caused by the overflow channels 14. The damping effect may even be dominated by the bypasses 16.

Locking means are provided for individually securing the positions of the pistons 32 in the piston chambers 31 after adjustment of the damping properties of the damper has been completed.

Figure 3:
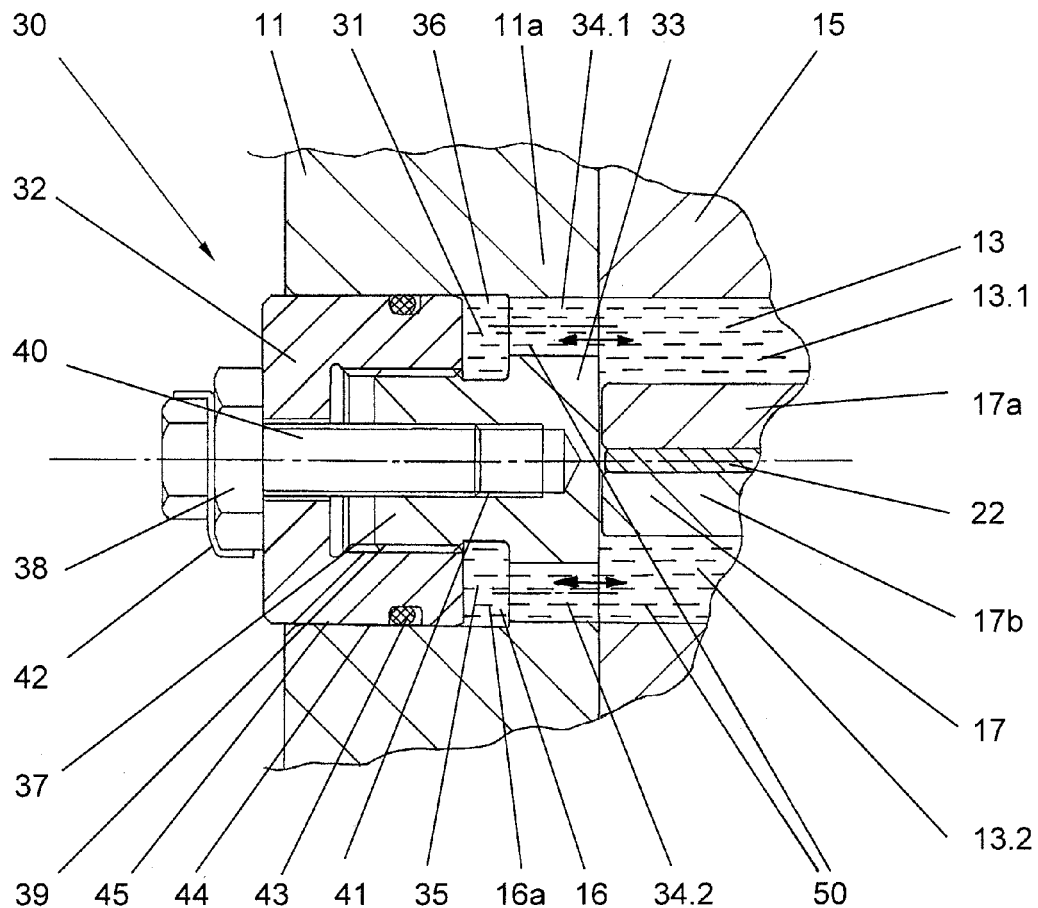
FIG. 3 is a detailed sectional view of an adjustment head of a torsional vibration damper according to FIG. 1.
Figure 4:
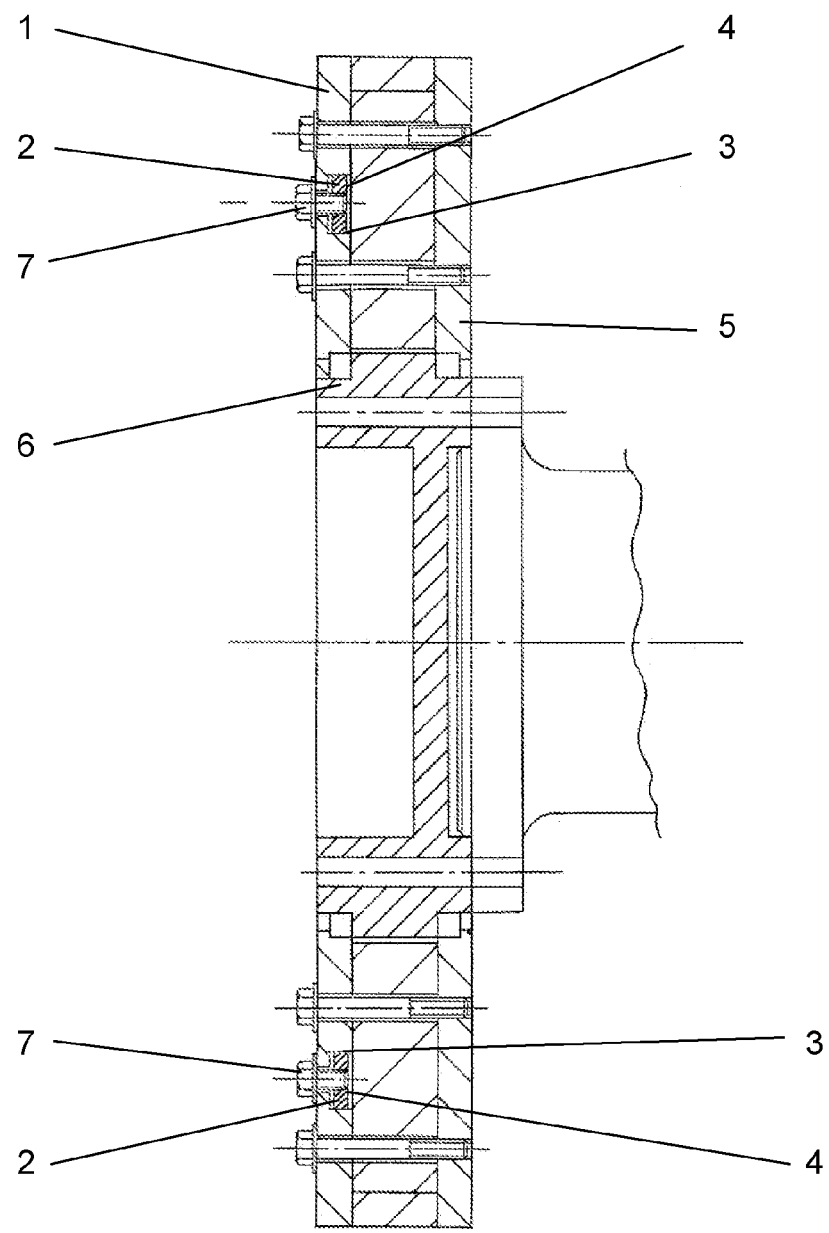
FIG. 4 is a longitudinal sectional view of a state of the art torsional vibration damper.

As will be readily apparent from FIG. 3, the adjustable part 16a of the bypass 16 is remote from the chamber 13 receiving the leaf spring assemblies 17. Thus, this adjustable part 16a is independent of any machining tolerances of surfaces and components inside the chamber 13. In addition, the length of the flow path between the sub-chambers is quite long which is of advantage for precise adjustment of the flow rate through the bypass 16.

There are several ways of implementing the inventive concept in a torsional vibration damper 10. One non-limiting example is described hereinafter with reference to FIG. 3.

In FIG. 3 the chambers 13 are axially delimited by the inner faces of the side walls 11a and 11b of the outer housing 11. The piston chambers 31 are integrally provided in at least one of these side walls 11a and 11b in the vicinity of the leaf spring assemblies 17.

More specifically, the piston chambers 31 are spaced apart from the chambers 13 receiving the leaf spring assemblies 17 by partition walls 33 that are integrally formed with the side wall 11a. The piston chambers 31 may be drilled or milled axially from the outside into the side wall 11a, i.e. from the side opposite to the chambers 13. Accordingly, the pistons 32 can be mounted into and removed from the piston chambers 31 from outside and without opening the damper 10.

The piston chamber 31 is connected to the corresponding one chamber 13 through fluid channels 34. In particular, the piston chamber 31 is connected with each of the sub-chambers via a fluid channel. Each fluid channel may be formed by one or more openings in the outer housing 11. Preferably, these openings extend in axial direction for ease of manufacturing.

In the first example shown in FIG. 2a the piston chamber 31 is connected via a first fluid channel 34.1 with the first sub-chamber 13.1 and via a second fluid channel 34.2 with the second sub-chamber 13.2.

In the second example shown in FIG. 2b the piston chamber 31' is connected via a first fluid channel 34.1' with the first sub-chamber 13.1', via a second fluid channel 34.2' with the second sub-chamber 13.2' and via a third fluid channel 34.3' with the third sub-chamber 13.3'. Each of the first and second fluid channels 34.1' and 34.2' may be formed by one or more openings 61.1' and 61.2' in the outer housing 11. In the present case two openings 61.3' and 61.4' are shown for the third fluid channel 34.3'. In a first variant all openings 61.1' to 61.4' open in a common piston chamber 31' and thus are hydraulically connected. Alternatively, it is possible to define independent bypasses between the first and third sub-chamber 13.1' and 13.3' as well as between the second and third sub-chamber 13.2' and 13.3', e.g. by corresponding compartments at the side of the piston chamber 31'.

Upon angular displacement between the outer housing 11, 11' and the inner part 12, 12' the volume of at least one of the sub-chambers increases and the volume of at least one other sub-chamber decreases, thereby causing damping medium to flow from the sub-chamber with decreasing volume to the sub-chamber with increasing volume via the corresponding fluid channels and bypass to provide hydraulic damping.

As shown in FIG. 3, within each piston chamber 31 a control gap 35 is formed between the piston 32 and a portion of the outer housing 11. The control gap 35 defines at least a portion of the adjustable part 16a of the bypass 16 or constitutes the adjustable part 16a of the bypass 16. The control gap 35 is arranged remote from the chamber 13 and is adjustable through the piston 32. In the embodiment of FIG. 3 the control gap 35 is formed between the partition wall 33 and a front face of the piston 32. The control gap 35 is fluidly connected with the chamber 13 via openings formed in the side wall 11a and extending axially through the side wall 11a from the chamber 13 to the piston chamber 31. These non-adjustable openings define the afore-mentioned fluid channels.

Each piston chamber 31 can be formed as a ring 36 around a central projection 37. This central projection 37 can be part of the partition wall 33 and thus be integrally formed with the side wall 11a of the outer housing 11. The piston 32 is threaded engaged with the central projection 37 so that adjustment of the gap 35 can be achieved by rotating the piston 32. A corresponding projection 38 for a wrench or the like is provided at an outer side of the piston 32.

The central projection may have an external thread 39 for engagement with a corresponding internal thread at the piston 32. However, the piston may as well have a screw portion for engagement with a screw hole on its outer housing.

In the present case, the piston may be countered by a screw 40 for locking the piston 32 after completion of adjustment. In FIG. 3 the screw 40 extends through the piston 32 and is threaded engaged with a threaded hole 41 on the central projection 37. The screw 40 may extend though the projection 38 of the piston 32. Additional securing devices 42 may be used for preventing loosening of the locking means.

A sealing ring 43 is arranged between an outer circumferential wall 44 of the piston 32 and an inner circumferential wall 45 of the piston chamber 31 to avoid leakage.

The invention has been described in detail on the basis of certain embodiments and modifications. In particular, it is possible to combine individual technical features that are described in conjunction with other technical features independent of the later with other individual technical features, even when not explicitly described, as long this is technically feasible. Thus, the invention is not limited to the described embodiments and its described modifications but rather encompasses all embodiments as defined by the claims.

What is claimed is:

1. A torsional vibration damper, comprising:
an outer housing;
an inner part concentric relative to the outer housing;
a plurality of chambers formed between the outer housing and the inner part and being filled with a damping medium;
a plurality of leaf spring assemblies joining the outer housing and the inner part in a torsionally flexible manner, wherein each of the leaf spring assemblies is arranged in one of said chambers and separates the corresponding chamber into at least two sub-chambers;
a plurality of piston chambers formed separately in the outer housing,
wherein for each of said chambers, the sub-chambers of said chamber are connected to one and the same piston chamber, respectively; and
a plurality of pistons adjustably arranged in the piston chambers, respectively, for controlling the flow of damper medium between the sub-chambers of the corresponding chamber.

2. The torsional vibration damper of claim 1, wherein the pistons are mounted into the piston chambers from a side opposite to the chambers receiving the leaf spring assemblies.

3. The torsional vibration damper of claim 2, wherein a control gap is formed between the piston and a portion of the outer housing within the corresponding piston chamber, which control gap is arranged remote from the chamber and adjustable through the piston.

4. The torsional vibration damper of claim 3, wherein each chamber is delimited axially by an inner face of a side wall of the outer housing and wherein the control gap is fluidly connected with the chamber via openings formed in the side wall and extending axially through the side wall from the chamber to the piston chamber.

5. The torsional vibration damper of claim 4 wherein the piston chambers are spaced apart from the chambers by partition walls that are formed integrally with the side wall of the outer housing.

6. The torsional vibration damper of claim 1 wherein the piston chambers are spaced apart from the chambers by partition walls that are formed integrally with a side wall of the outer housing.

7. The torsional vibration damper of claim 1, wherein each piston chamber is connected via fluid channels with the sub-chambers of the corresponding chamber, each of said fluid channels being formed by one or more openings in the outer housing.

8. The torsional vibration damper of claim 1, wherein said chambers are separated in circumferential direction by inner circumferential sections, and at least one of the chambers is divided by the leaf spring assembly into two sub-chambers, namely a first sub-chamber and a second sub-chamber, that are formed between an outer side of the outermost spring and an opposing wall of the adjacent inner circumferential sections, respectively.

9. The torsional vibration damper of claim 1, wherein said chambers are separated in circumferential direction by inner circumferential sections, and at least one of the chambers is divided by the leaf spring assembly into three sub-chambers, namely a first sub-chamber and a second sub-chamber, that are formed between an outer side of the outermost spring and an opposing wall of the adjacent inner circumferential sections, respectively, and a third sub-chamber formed between at least two springs of the leaf spring assembly.

10. The torsional vibration damper of claim 1, further comprising a plurality of locking means for individually securing the positions of the pistons in the piston chambers.

11. The torsional vibration damper of claim 1, wherein each piston chamber is formed as a ring around a central projection and the corresponding piston is fastened on the projection.

12. The torsional vibration damper of claim 11, wherein the piston is threaded engaged with the central projection.

13. The torsional vibration damper of claim 12, wherein the central projection has an external thread and the piston is threaded engaged with the external thread of the central projection.

14. The torsional vibration damper of claim 11, wherein the piston is countered by a screw.

15. The torsional vibration damper of claim 14, wherein the screw extends through the piston and is threaded engaged with a threaded hole on the central projection.

16. The torsional vibration damper of claim 1, wherein a sealing ring is arranged between an outer circumferential wall of the piston and an inner circumferential wall of the piston chamber.

17. A torsional vibration damper, comprising:
an outer housing;
an inner part concentric relative to the outer housing;
a plurality of chambers formed between the outer housing and the inner part and being filled with a damping medium;
a plurality of leaf spring assemblies joining the outer housing and the inner part in a torsionally flexible manner, wherein each of the leaf spring assemblies is arranged in one of said chambers and separates the corresponding chamber into at least two sub-chambers;
a plurality of piston chambers formed separately in the outer housing, wherein for each of said chambers, the sub-chambers of said chamber are connected to one and the same piston chamber, respectively; and
a plurality of pistons adjustably arranged in the piston chambers, respectively, for controlling the flow of damper medium between the sub-chambers of the corresponding chamber when displacement of damping medium occurs in said chamber due to bending of the corresponding leaf spring assembly;
wherein the pistons are mounted into the piston chambers from a side opposite to the chambers receiving the leaf spring assemblies.

18. The torsional vibration damper of claim 17, further comprising a plurality of locking means for individually securing the positions of the pistons in the piston chambers.

19. A torsional vibration damper, comprising:
an outer housing;
an inner part concentric relative to the outer housing;
a plurality of chambers formed between the outer housing and the inner part and being filled with a damping medium;
a plurality of leaf spring assemblies joining the outer housing and the inner part in a torsionally flexible manner, wherein each of the leaf spring assemblies is arranged in one of said chambers and separates the corresponding chamber into at least two sub-chambers;
a plurality of piston chambers formed separately in the outer housing, wherein for each of said chambers, the sub-chambers of said chamber are connected to one and the same piston chamber, respectively; and a plurality of pistons adjustably arranged in the piston chambers, respectively, for controlling the flow of damper medium between the sub-chambers of the corresponding chamber when displacement of damping medium occurs in said chamber due to bending of the corresponding leaf spring assembly;

wherein a control gap is formed between the piston and a portion of the outer housing within the corresponding piston chamber, which control gap is arranged remote from the chamber and adjustable through the piston; and wherein each chamber is delimited axially by an inner face of a side wall of the outer housing and wherein the control gap is fluidly connected with the chamber via openings formed in the side wall and extending axially through the side wall from the chamber to the piston chamber.

20. The torsional vibration damper of claim 19, further comprising a plurality of locking means for individually securing the positions of the pistons in the piston chambers.

\* \* \* \* \*